Dec. 4, 1934.            A. J. HOCKMAN            1,983,459
                    STEERING GEAR SAFETY DEVICE
                    Filed Oct. 27, 1933    5 Sheets-Sheet 1

A. J. Hockman
INVENTOR
BY Victor J. Evans & Co.
ATTORNEY

Dec. 4, 1934.  A. J. HOCKMAN  1,983,459
STEERING GEAR SAFETY DEVICE
Filed Oct. 27, 1933   5 Sheets-Sheet 4

A. J. Hockman
INVENTOR
BY Victor J. Evans
+ Co.
ATTORNEY

Dec. 4, 1934.  A. J. HOCKMAN  1,983,459
STEERING GEAR SAFETY DEVICE
Filed Oct. 27, 1933   5 Sheets-Sheet 5
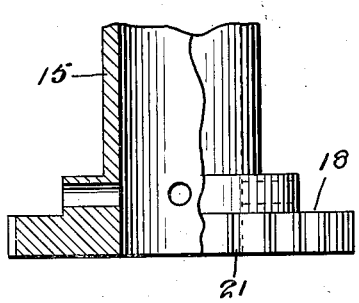
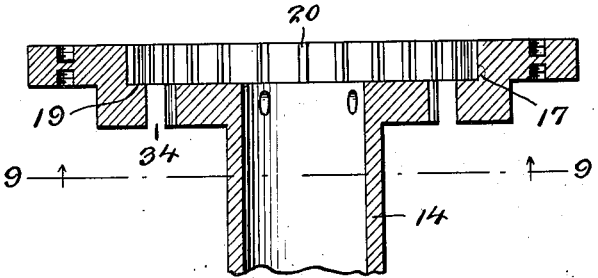
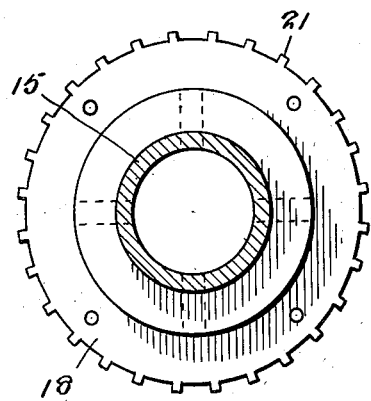
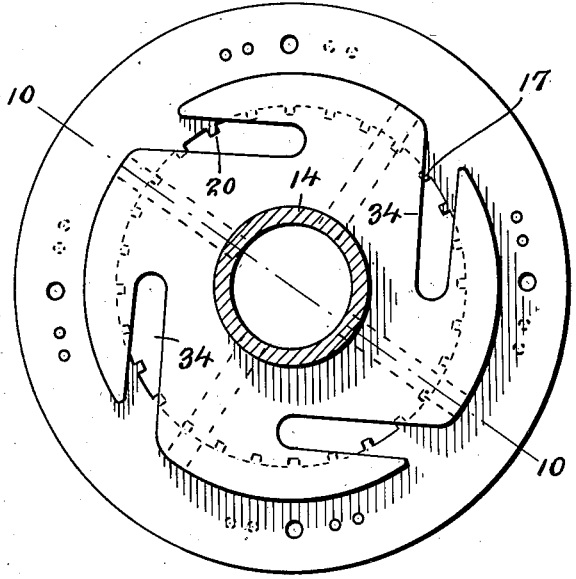
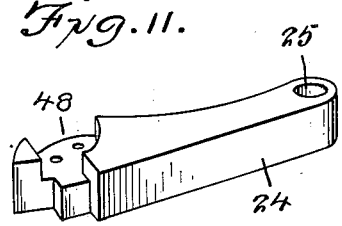
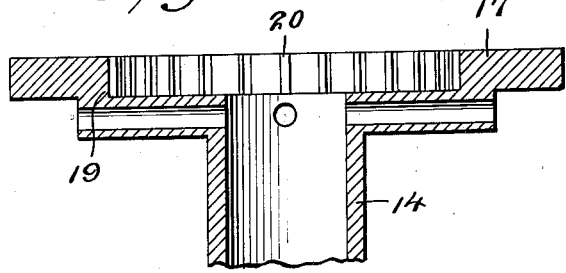

Patented Dec. 4, 1934

1,983,459

UNITED STATES PATENT OFFICE 1,983,459

STEERING GEAR SAFETY DEVICE

Ashby J. Hockman, Portsmouth, Va.

Application October 27, 1933, Serial No. 695,537

5 Claims. (Cl. 192—8)

The invention relates to a steering gear safety device and more especially to an automatic steering gear safety device for motor vehicles, as for example, pleasure vehicles, busses, trucks or the like.

The primary object of the invention is the provision of a device of this character, wherein all sudden strains and shocks within reason that occur on front wheels of the vehicle, due to blow-outs or other causes, will not permit the front wheels to turn to one side or the other as the device will automatically lock the steering gear and such front wheel will not be permitted to turn to either side unless the steering wheel is manually turned to one side or the other and thus in this automatic locking safety is assured, minimizing the liability of loss of life and property damage.

Another object of the invention is the provision of a device of this character, wherein the sudden shocks or strains imparted to the front wheels of a vehicle of the motor type will not affect the steering wheel in the least, in that the latter will have a tendency to throw the driver's hand, which is a frequent occurrence in careless driving, and in that prior cognizance cannot be had of the moment of such shock or strain and thus avoiding disconcerting such driver, with resultant accident incident thereto.

A further object of the invention is the provision of a device of this character, wherein the construction thereof is novel in form and is automatic in its working so that in event of a blowout the front wheels will be held in their initial position until the driver has a chance to take care of the vehicle under such condition, the device being released for slow driving and parking or whatever is necessary.

A still further object of the invention is the provision of a device of this character which is comparatively simple in construction, thoroughly reliable and efficient in its purposes, automatic in action, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 6 is a fragmentary detail elevation partly in section of one of the gear parts of the device.

Figure 7 is a horizontal sectional view therethrough showing the gear in plan.

Figure 8 is a fragmentary vertical sectional view through the other gear of the device.

Figure 9 is a sectional view on the line 9—9 of Figure 8 looking in the direction of the arrows.

Figure 10 is a sectional view on the line 10—10 of Figure 9.

Figure 11 is a perspective view of one of the ratchet dogs of the device.

Figure 12 is a plan view of one of the upper release arms.

Figure 13 is a vertical section therethrough.

Figure 14 is a fragmentary vertical sectional view through another of the upper release arms.

Figure 15 is a fragmentary vertical sectional view through one of the lower release arms.

Figure 16 is a fragmentary vertical sectional view of another of the lower release arms.

Figure 17 is a plan view of one of the throwout arms.

Figure 18 is a side elevation thereof.

Similar reference characters indicate corresponding parts throughout the several views in the drawings.

Figure 1:
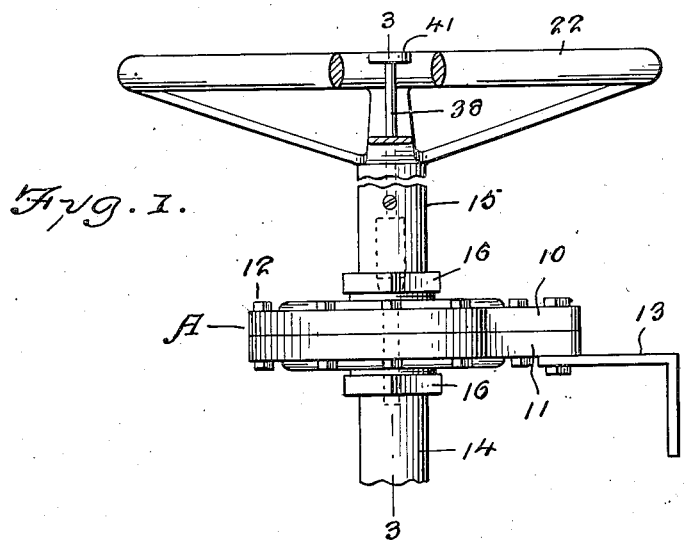
Figure 1 is a fragmentary side elevation of a steering gear post or column with the device constructed in accordance with the invention associated therewith.
Figure 2:
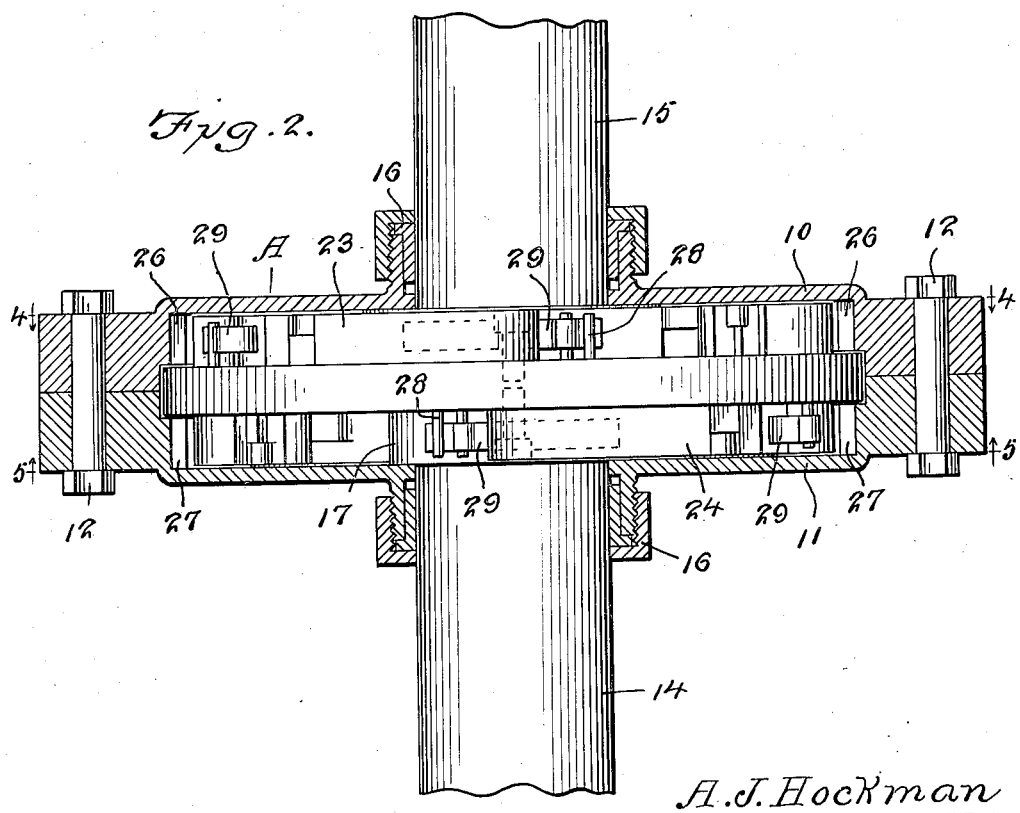
Figure 2 is an enlarged vertical sectional view through the device.
Figure 3:
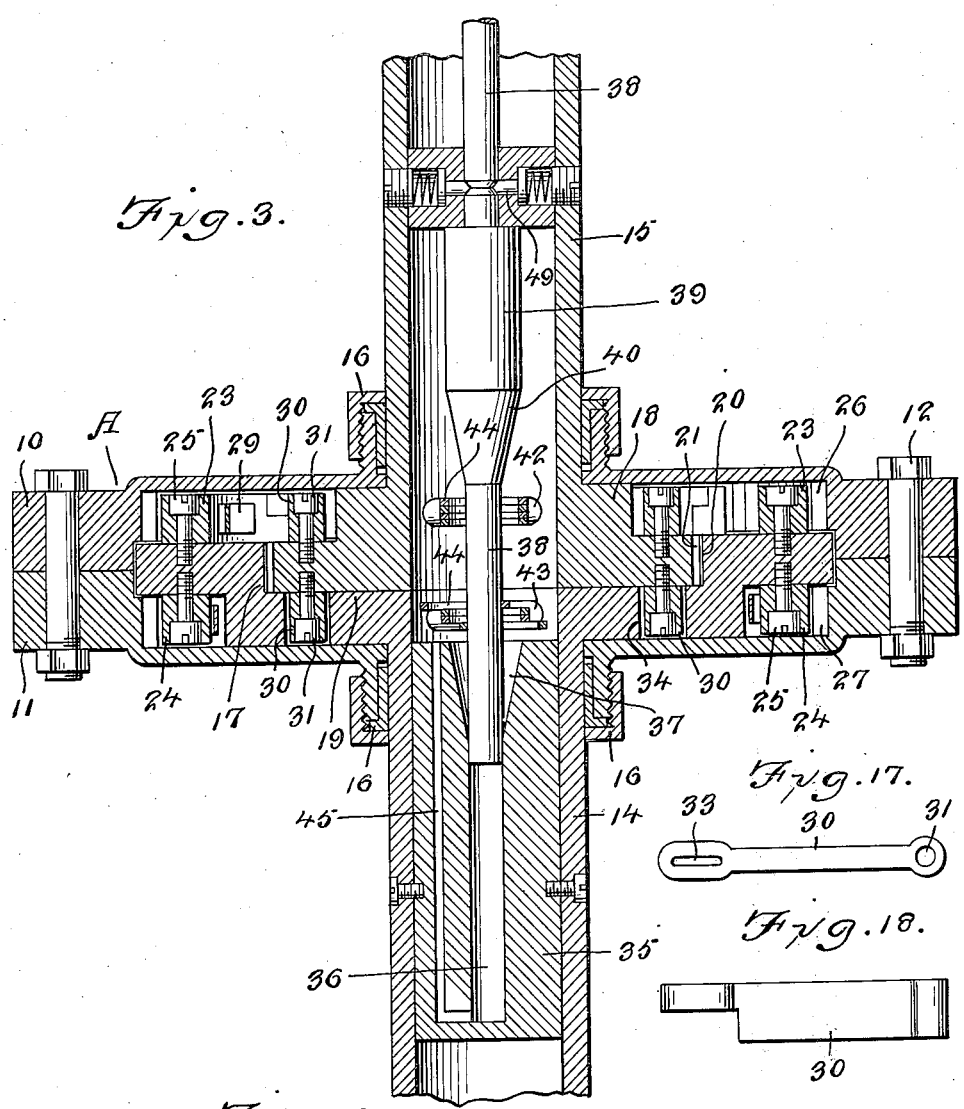
Figure 3 is a sectional view on the line 3—3 of Figure 1.

Referring to the drawings in detail, A designates generally a housing having the separable upper and lower sections 10 and 11, respectively, these being joined to each other by bolt fasteners 12 and in the joining the sections are fluidproof so as to contain and retain lubricant. The housing A is made fast in the vehicle body, at the proper location, by a bracket 13 so that such housing is stationary.

Figure 4:
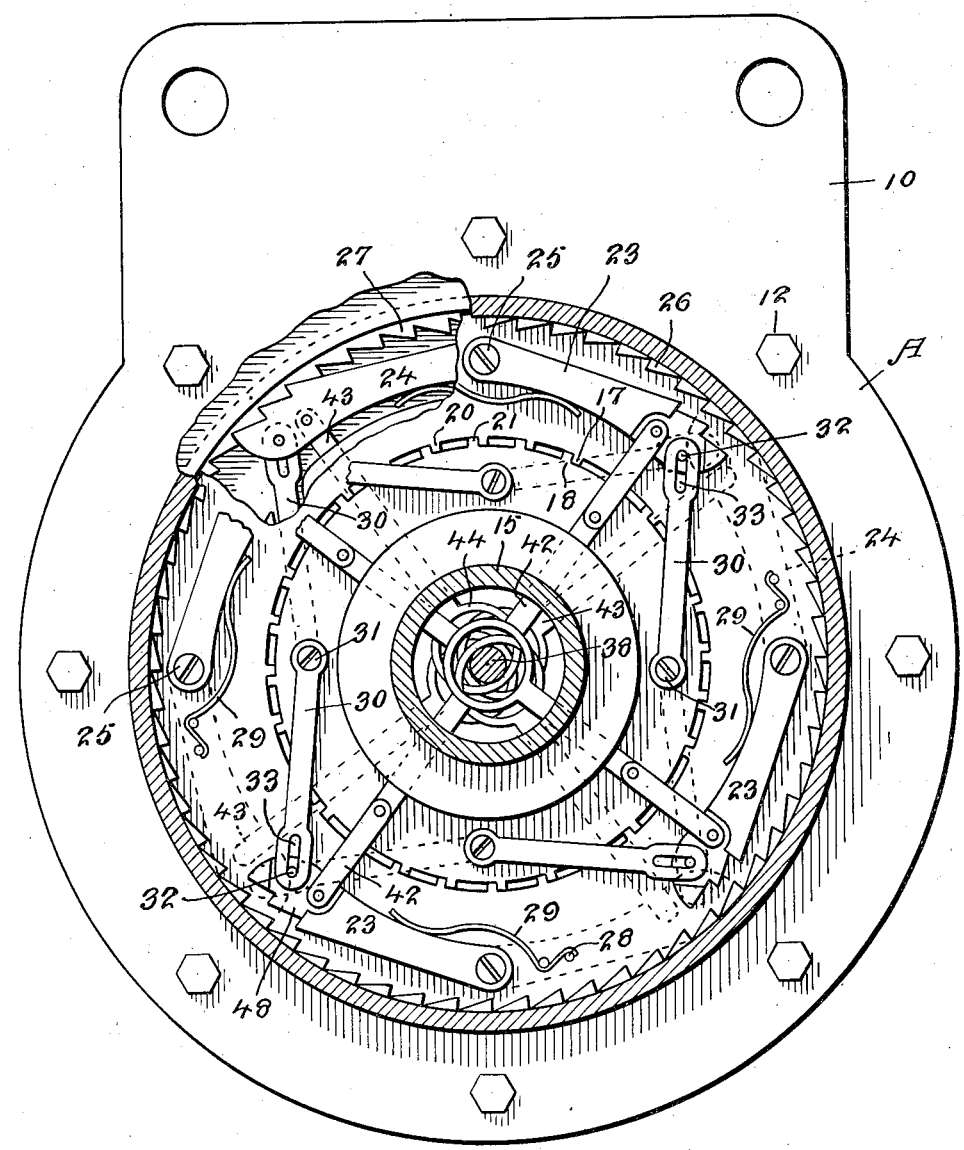
Figure 4 is a sectional view on the line 4—4 of Figure 2.
Figure 5:
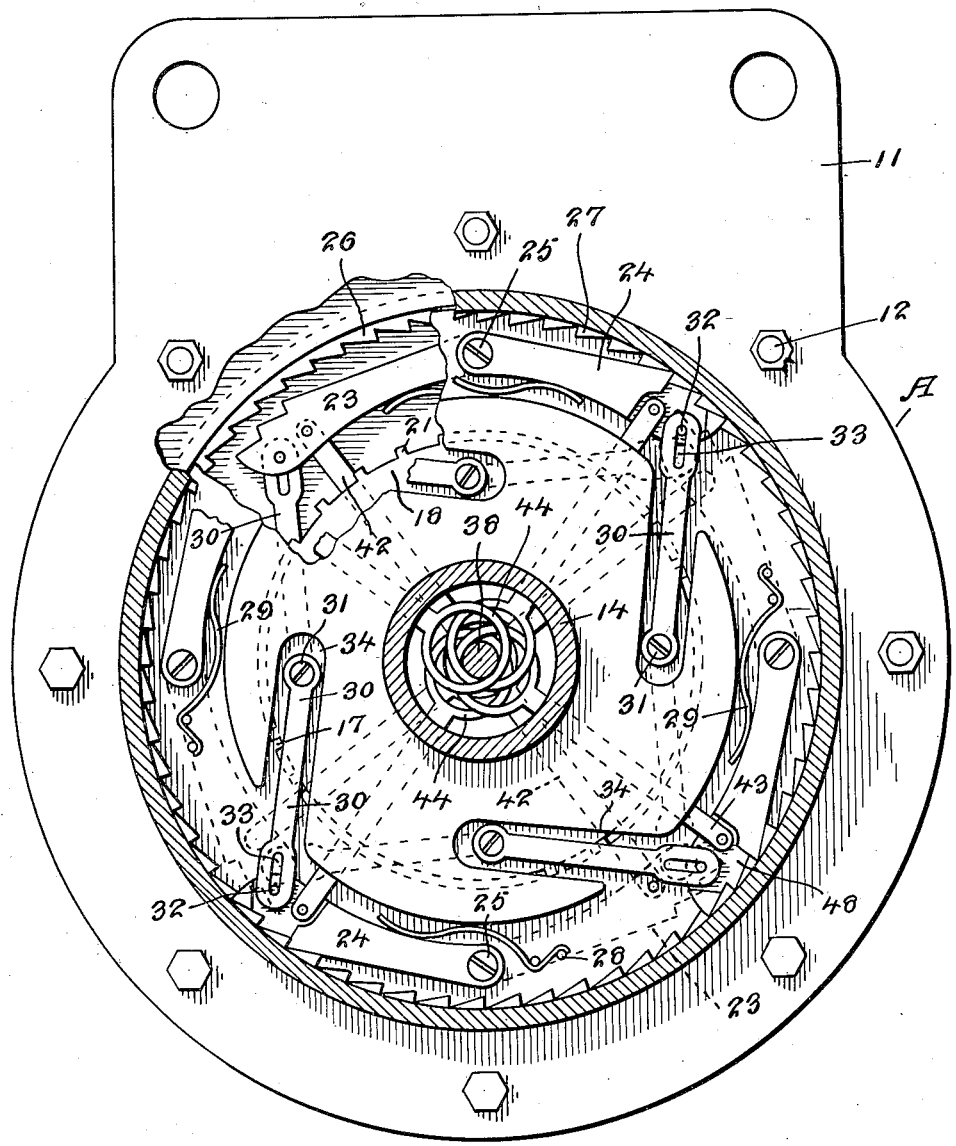
Figure 5 is a sectional view on the line 5—5 of Figure 2.

Extended within the housing A is the worm gear operating section 14 and the hand wheel operating section 15, respectively, of a steering post or column for a motor vehicle, these sections being of tubiform and passing through stuffing boxes 16 arranged with the housing. The section 14, interiorly of the housing A, is formed with the cupped gear 17, while the section 15 within the housing is formed with a gear 18 and is received in the cup 19 of the gear 17 having the teeth 20 for interfitting with the teeth 21 of the gear 18, there being a space between the teeth 20 and 21 throughout the series thereof to permit a determined play between these gears 17 and 18, as will be apparent from Figure 4 of the drawings.

The section 15 carries the usual hand steering wheel 22 and on manipulation thereof, turning movement will be imparted from the section 15 to the section 14 by the meshing engagement of the gears 17 and 18, as should be obvious, and in this fashion, under normalcy, the front steering wheels are guided.

Carried by the gear 17, at the outer periphery thereof, are the upper and lower reversely locking ratchet dogs 23 and 24, respectively. The dogs are pivoted at 25 to the said gear 17 and are disposed reversely to each other for engagement with the ratchet gears 26 and 27, respectively, formed with the housing A, it being understood, of course, that these gears are set correspondingly to the ratchet dogs 23 and 24 so that on the turning of said gear 17, one series of ratchet dogs 24 will lock with its ratchet gear, while the other series will ratchet with its ratchet gear.

Suitably mounted through the medium of anchoring pins 28 upon the gear 17 are tensioning springs 29, these being active upon the ratchet dogs 23 and 24 to urge the same into locking relation to their ratchet gears 26 and 27.

Carried by the gear 18 at its periphery are throw-out arms 30, these being pivoted at 31 thereto above and below the same and having loose pivotal play connection at 32 with the ratchet dogs 23 and 24, respectively, the play being had through the slots 33 receiving the pivot 32 and formed in said arms 30 for a purpose presently described. It will be seen that these arms 30, in pairs, connect an upper ratchet dog 23 with a lower ratchet dog 24 and upon the connection of the latter the gear 17 is provided with the clearance spaces or slots 34 accommodating those arms 30 connected with the ratchet dogs 24.

Mounted interiorly of the section 14 of the steering post or column, next to the housing A, is a barrel 35 having the central guide bore 36 longitudinally therein merging into a flared inverted substantially conical-shaped socket 37 opening through the upper end of said barrel. Slidably fitted centrally in the upper section 15 of the steering column is a releasing stem 38 having its lower end guided in the bore 36 and formed with a combination centering and releasing plug 39 having the tapered portions 40 corresponding to the socket 37. The stem 38 protrudes through the steering wheel 22 to its center for convenient access by an operator of such wheel and is formed with a terminal button or head 41 constituting a hand grip, the said stem being manually manipulated for a purpose presently described.

Slidably fitted and radially disposed in the gears 17 and 18 are lower and upper series of release arms 42 and 43, respectively, which are formed with the circular ringlike inner ends 44 encircling the stem 38 and with which cooperates the plug 39 upon said stem so that when such stem is lowered under manual pressure thereon the tapered end 40 of the plug will pass through the ring-like ends 44 of the arms 42 and 43 for action upon the same so that when the plug enters these ends 44 they will become centered with respect to each other. Thus the arms will be moved to retract the dogs 23 and 24, freeing the same from their ratchet gears and in this the steering of the vehicle can be had in a normal way through the steering wheel 32 without the automatic working of the steering gear safety device.

The barrel 35 is provided with a lubricant lead 45 to permit the circulation of lubricant to and from the bore 36 in said barrel, the other parts of the device being thoroughly lubricated directly from the housing A.

To enable the assembling of the release arms 42 and 43, each is made up of hinged and separable sections 46 and 47, respectively, as is clearly shown in Figures 12 to 16 of the drawings.

The throw-out arms 30 are counterseated at their pivoted ends in the dogs 23 and 24, the latter being cut away at 48 for this purpose.

In the operation of the device, when the vehicle is traveling a road or a street the stem 38 is in elevated or raised position and is latched by the spring latches 49 carried in the section 15 of the steering post or column, thus the releasing arms 42 and 43 are free, so that under the action of the springs 29 the dogs 23 and 24 will be urged for locking engagement with the ratchet gears 26 and 27 of the housing A. Now, assuming that the front wheels of the vehicle are subjected to a sudden shock or strain having a tendency to swerve the vehicle to one side or the other of the way, instantly the ratchet dogs 23 or 24 will lock with their ratchet gears and thus maintain the front wheels in their directed course to eliminate this side swerving. Should the operator desire to steer the wheels it only becomes necessary to turn the steering wheel according to the course desired and in this the meshing of the gears 17 and 18, under their action, will automatically control the ratchet dogs, causing both series of dogs to become free from their gears 26 and 27 so that the driver of the vehicle will have complete control of the steering thereof. It will be understood, of course, that the front wheels will be locked from side turning in one direction by one series of ratchet dogs and the other series will be free to ratchet from their companion ratchet gears when the vehicle is steered in the reverse direction or to the other side of the course.

It should be clearly apparent that the device is automatic in its working and will take care of all sudden strains and shocks occurring on the front wheels of a motor vehicle to not allow the front wheels to turn to one side or the other except by the turning of the steering wheel 22 and such front wheels can only follow the direction the steering wheel is turned.

When it is desired to render the device inactive, the stem 49 is manually manipulated by hand pressure thereon so that the plug 39 will act upon the releasing arms 42 and 43, retreating the ratchet dogs 23 and 24 away from their ratchet gears 26 and 27 and in this position the steering of the vehicle can be had in the ordinary manner directly from the steering wheel.

What is claimed is:

1. In a steering gear safety device of the character described, a sectional steering column, interfitted gears on the sections of said column and having a predetermined play with relation to each other, a fixed housing enclosing said gears, reversely acting ratchet dogs on one of said gears, companion ratchet gears formed interiorly of the housing for the said dogs, throw means carried by the other first-named gears and connecting in pairs the reversely acting ratchet dogs, a steering wheel operating one of the sections of said column, and means manually controlled and accessible at the steering wheel to retract the ratchet dogs to render the same inactive with the companion ratchet gears.

2. In a steering gear safety device of the character described, a sectional steering column, interfitted gears on the sections of said column and having a predetermined play with relation to each other, a fixed housing enclosing said gears, reversely acting ratchet dogs on one of said gears, companion ratchet gears formed interiorly of the housing for the said dogs, throw means carried by the other first-named gears and connecting in pairs the reversely acting ratchet dogs, a steering wheel operating one of the sections of said column, means manually controlled and accessible at the steering wheel to retract the ratchet dogs to render the same inactive with the companion ratchet gears, and means for urging the ratchet dogs in the direction of their companion ratchet gears.

3. In a steering gear safety device of the character described, a sectional steering column, interfitted gears on the sections of said column and having a predetermined play with relation to each other, a fixed housing enclosing said gears, reversely acting ratchet dogs on one of said gears, companion ratchet gears formed interiorly of the housing for the said dogs, throw means carried by the other first-named gears and connecting in pairs the reversely acting ratchet dogs, a steering wheel operating one of the sections of said column, means manually controlled and accessible at the steering wheel to retract the ratchet dogs to render the same inactive with the companion ratchet gears, and means for urging the ratchet dogs in the direction of their companion ratchet gears, the said gear carrying the ratchet dogs being provided with clearances for certain of the throw means for said dogs.

4. In a steering gear safety device of the character described, a sectional steering column, interfitted gears on the sections of said column and having a predetermined play with relation to each other, a fixed housing enclosing said gears, reversely acting ratchet dogs on one of said gears, companion ratchet gears formed interiorly of the housing for the said dogs, throw means carried by the other first-named gears and connecting in pairs the reversely acting ratchet dogs, a steering wheel operating one of the sections of said column, a slidable stem fitted in the section having the steering wheel, a plurality of release arms fitted in said first-named gears and connected with the ratchet dogs for retracting the same to render them inactive and having inner ends controlled by said stem for moving the releasing arms to the position for the inoperativeness of the ratchet dogs, and a handhold on said stem and accessible at the steering wheel.

5. In a steering gear safety device of the character described, a sectional steering column, interfitted gears on the sections of said column and having a predetermined play with relation to each other, a fixed housing enclosing said gears, reversely acting ratchet dogs on one of said gears, companion ratchet gears formed interiorly of the housing for the said dogs, throw means carried by the other first-named gears and connecting in pairs the reversely acting ratchet dogs, a steering wheel operating one of the sections of said column, a slidable stem fitted in the section having the steering wheel, a plurality of release arms fitted in said first-named gears and connected with the ratchet dogs for retracting the same to render them inactive and having inner ends controlled by said stem for moving the releasing arms to the position for the inoperativeness of the ratchet dogs, a handhold on said stem and accessible at the steering wheel, and means for latching the stem in position for operating the releasing arms.

ASHBY J. HOCKMAN.